United States Patent

[11] 3,578,207

[72] Inventor James F. Danow
 2163 Vine St., Apt. A, Berkeley, Calif. 94709
[21] Appl. No. 769,316
[22] Filed Oct. 21, 1968
[45] Patented May 11, 1971

[54] ADJUSTABLE BREAD DSIPENSER WITH EJECTOR-CONTROLLED CLOSURE
 11 Claims, 6 Drawing Figs.
[52] U.S. Cl. .................................................. 221/232, 221/242, 221/247
[51] Int. Cl. ........................................................ B65h 1/08
[50] Field of Search .................................. 221/232, 248, 268, 269, 271, 206, 207, 273—276, 241, 242, 247

[56] References Cited
 UNITED STATES PATENTS

| | | | |
|---|---|---|---|
| 1,319,084 | 10/1919 | Hume ........................... | 221/232 |
| 1,913,843 | 6/1933 | Marcuse ....................... | 221/232X |
| 2,426,999 | 9/1947 | Hilton et al. ................... | 221/269X |
| 3,233,778 | 2/1966 | Cobb et al. .................... | 221/232 |
| 3,289,861 | 12/1966 | Carle et al. .................... | 221/268X |
| 1,229,741 | 6/1917 | Garcia ........................... | 221/248X |
| 2,491,053 | 12/1949 | Mondorf ....................... | 221/276X |
| 2,601,118 | 6/1952 | Guesmer et al. ............... | 221/206 |
| 2,784,872 | 3/1957 | Lux ............................... | 221/207 |
| 2,937,787 | 5/1960 | Taylor et al. .................. | 221/248 |

*Primary Examiner*—Samuel F. Coleman
*Attorney*—Fryer, Tjensvold, Feix, Phillips & Lempio

ABSTRACT: A bread dispenser comprises a container adapted to retain a stack of sliced bread therein. Spring means are disposed at one end of the container to urge the bread towards a dispensing means mounted at the other end thereof. The dispensing means comprises a guillotinelike plunger reciprocally mounted on the container to dispense one or more bread slices.

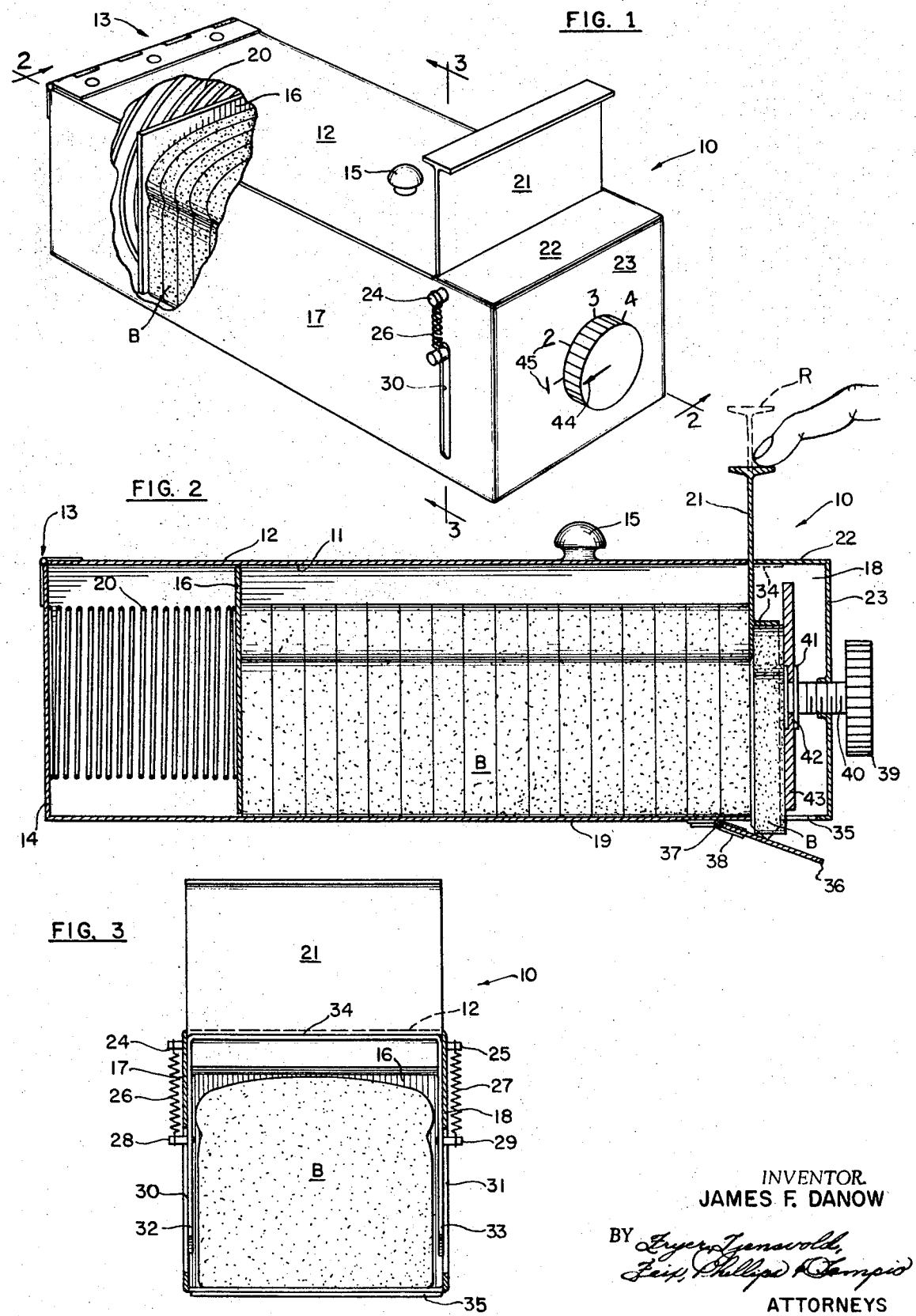

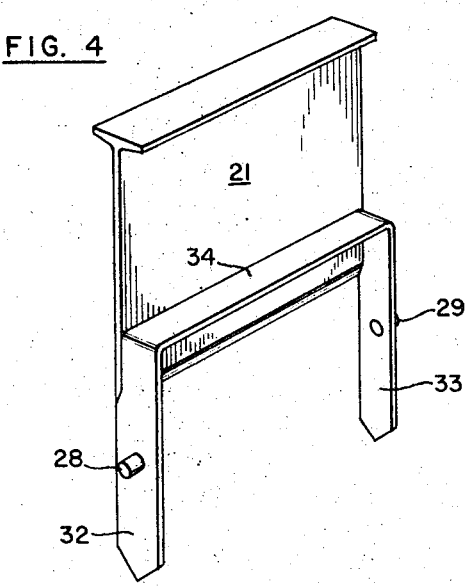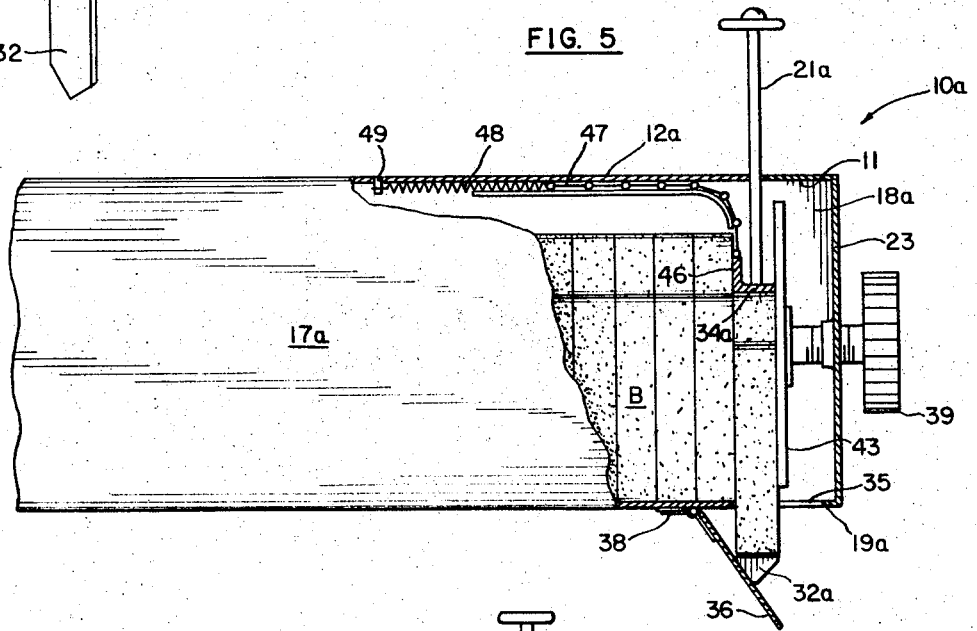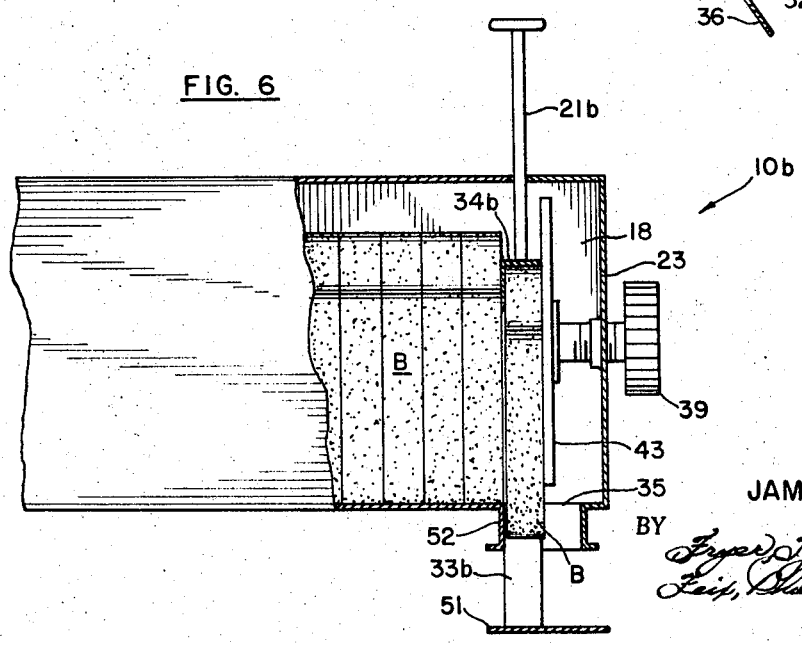
INVENTOR
JAMES F. DANOW
ATTORNEYS

ADJUSTABLE BREAD DSIPENSER WITH EJECTOR-CONTROLLED CLOSURE

Sliced bread is normally packaged by means of a wrapper tightly folded and secured about the bread. Once the wrapper is broken the slices of bread may be removed therefrom for consumption purposes. Such a conventional packaging technique oftentimes proves unsanitary and does not maintain the bread in a fresh condition over extended periods of time. In addition, restaurants and the like require expeditious and efficient removal of the bread slices when they are served during meals.

An object of this invention is to provide a low cost and noncomplex dispenser for expeditiously and efficiently dispensing articles such as bread. The dispenser comprises a boxlike container adapted to retain a stack of sliced bread or other articles therein. Spring means are constructed and arranged at one end of the container for urging the bread towards a dispensing means mounted at a second end thereof. The dispensing means comprises a plunger movably mounted on the container to be actuated to remove one or more bread slices out of the container. If so desired, means may be provided for adjusting the number or size of bread slices dispensed upon a single actuation of the plunger.

Other objects of this invention will become apparent from the following description and accompanying drawings wherein:

FIG. 1 is an isometric view of a bread dispenser with the container thereof partially broken away;

FIG. 2 is a longitudinal, cross-sectional view taken in the direction of arrows 2–2 in FIG. 1, but showing a plunger employed in the dispenser in a partially depressed position;

FIG. 3 is a cross-sectional view taken in the direction of arrows 3–3 in FIG. 1;

FIG. 4 is an isometric view of a plunger employed in the FIGS. 1—3 bread dispenser;

FIG. 5 is a partial, side elevational view of a modified bread dispenser with the container thereof partly broken away and parts sectioned; and FIG. 6 is a partial, side elevational view of a further modified bread dispenser with the container thereof partially broken away and parts sectioned.

The bread dispenser illustrated in FIGS. 1—4 comprises a stationary boxlike container arranged along a longitudinal axis thereof. The container forms a closed chamber 11 of rectangular cross section adapted to retain a stack of sliced bread $\underline{B}$ therein. A cover plate 12, substantially forming the container's top wall, may be connected by a hinge 13 to a vertically disposed rear end wall 14. Thus the chamber may be exposed to place the bread therein by lifting the cover plate by means of a knob 15 secured thereto.

A rectangular pusher plate 16 is reciprocally mounted in the chamber and guided in its movements by cover plate 12, opposed sidewalls 17 and 18 and a bottom wall 19. A coil spring 20 (FIG. 2) is preferably arranged between fixed end wall 14 and the pusher plate to provide a biasing means along with the pusher plate. The biasing means is arranged adjacent to a first end of the container for urging the bread along the container's longitudinal axis and rightwardly towards a second end thereof. The bread dispensing means comprises a guillotinelike plunger 21 having a vertically disposed plate portion thereof reciprocally mounted for movements transverse to the container's axis.

The plate portion projects through an elongated slot formed between cover plate 12 and a stationary top plate portion 22 secured to a front end wall 23. As clearly illustrated in FIGS. 1 and 3, pins 24 and 25 are secured exteriorly on the sidewalls and carry tension springs 26 and 27 thereon, respectively. The springs comprise reset means respectively secured to pins 28 and 29 which project through vertically disposed slots 30 and 31 formed in the opposed sidewalls. The latter pins are respectively secured to vertically disposed prong portions 32 and 33 secured to opposite ends of a horizontally disposed flange portion 34, extending towards the second end of the container, to form a U-shaped dispensing bracket substantially encompassing a bread slice.

Opening means comprises an elongated and rectangular slot 35 formed across and through bottom wall 19 and in juxtaposed relationship to the plunger for bread-dispensing purposes. A trap door 36 is pivoted by pin 37 to the bottom wall and is adapted to be opened by the pointed ends of juxtaposed prongs 32 and 33 during the bread-dispensing function. A spring 38 is mounted on pivot pin 37 to normally retain door 36 closed when the plunger is maintained in its raised, dotted line position (R) illustrated in FIG. 2. It should be understood that the trap door could be eliminated from the dispenser if so desired.

The bread dispenser preferably comprises means for adjusting the dispenser to accommodate bread slices of varied thickness and/or to adjust it for the number of bread slices allowed to be dispensed. Such means may comprise an axially adjustable control knob 39 secured to a shank 40 threaded to end wall 23. Collars 41 are secured to the shank's other end and loosely mount and retain an annular flange 42 therebetween, formed on an axially movable adjustment plate 43. The adjustment plate may comprise a rectangular configuration having a width slightly less than the distance between sidewalls 17 and 18 to prevent rotation thereof.

Thus rotation of knob 39 will selectively align an arrow 44 formed thereon (FIG. 1) with one of a plurality of indicia means 45 to select a bread slice thickness and/or the number of bread slices to be dispensed. In the illustrated position the adjustment means is positioned to allow only one slice of bread to be dispensed at a time. Although opening 35 (FIG. 2) is illustrated for allowing a maximum dispensing of two bread slices it should be understood that the container could be elongated and the opening enlarged to dispense three or more such slices. Also, the configuration of chamber 11 could be suitably reshaped to accommodate it for the retention and dispensing of articles other than bread.

The dispenser functions in the following manner. When chamber 11 is empty cover 12 is lifted by knob 15 to expose the empty chamber. Pusher plate 16 is depressed manually against spring 20 a sufficient amount to permit the stack of bread slices to be loaded into the chamber between the pusher plate and adjustment plate 43. The lower knife edge portion of the plunger projects vertically below flange portion 34 to positively separate the discharged bread slice from the next adjacent one.

Flange portion 34 functions to then engage and move a piece of bread out of the dispenser through aperture 33. Trap door 36 is gradually pivoted to a fully opened position by the lower ends of prongs 32 and 33 and the bread is thus positively guided out of the dispenser. Release of the plunger will automatically permit the reset means comprising springs 26 and 27 to return it to its normally raised position (R).

FIG. 5 illustrates a modified dispensing means for removing at least one bread slice out of dispenser 10a. Such dispensing means comprises a plunger 21a (shown partially depressed) reciprocally mounted through an elongated slot formed in a top cover plate 12a. The plate is secured to a horizontally disposed flange portion 34a which is secured to two opposed prongs, one of which is shown at 32a, corresponding to prongs 32 and 33 of the first described embodiment. An upstanding flange 46 is secured to flange 34a and has a flexible sheetlike member 47 attached thereto.

A tensioned coil spring 48, located interiorly of the container, is attached between member 47 and a stationary pin 49 attached to cover plate 12a to normally urge the plunger to a retracted position. A guide bracket 50 may be secured between sidewalls 17a and 18a of the dispenser to guide movements of the spring and the flexible member. Trap door 36 as well as the adjustment means comprising knob 39 may also be utilized therein.

FIG. 6 illustrates a further modified dispensing means 10b comprising a vertically disposed plunger 21b (shown partially depressed) having the vertical plate thereof secured to a horizontally disposed flange 34b and a pair of opposed prongs, one of which is shown at 33b. A second horizontally disposed flange 51 is secured between the lower ends of the two prongs and functions to normally cover a rectangularly shaped discharge chute 52 which replaces trap door 36. In addition, flanges 34b and 51 are suitably spaced at a distance substantially equaling the height of a bread slice.

Means, such as springs 26 and 27 or spring 48, may be utilized for returning plunger 21b to its normally retracted position after it has been fully depressed for bread dispensing purposes. Bread slice adjusting means comprising knob 36 and its attendant structures may also be employed therewith. It should be further understood that the FIGS. 1—4, 5 and 6 dispensers may utilize a pivoted cover plate, a pivoted rear end panel or other suitable means for loading the container with a stack of sliced bread. For example, a tongue-and-groove arrangement may be employed between cover plate 12 and sidewalls 17 and 18 to permit linear removal of the cover plate for loading purposes.

I claim:

1. A bread dispenser comprising a substantially totally enclosed container having sidewalls closed by opposite end walls forming a single elongated chamber of substantially rectangular cross section, one of said walls being movable to introduce a plurality of stacked bread slices therein, biasing means disposed in said chamber adjacent one of said end walls engaging the full cross section of a rearmost bread slice for urging said bread slices to said other end, at least two substantially oppositely disposed openings formed in said sidewalls adjacent said other end, dispensing means comprising a plunger movably mounted in one of said openings, means normally closing said other opening, reset means connecting said plunger and at least one of said walls for urging said plunger upwardly out of said opening to permit passage of at least one of said bread slices toward said other end, said plunger including means limiting upwardly movement thereof to maintain the same within the chamber and serving to engage and move said one slice outwardly through said other opening upon depression of the same, other means on said plunger opening said means normally closing said opening upon depression thereof to insure no damage to said one bread slice, and adjusting means mounted on said other end forwardly of said plunger including a plate disposed in said chamber for normally engaging said one bread slice and adapted to be selectively moved to vary the size of said other opening whereby slices of various thickness can be dispensed therefrom.

2. The invention of claim 1 wherein said biasing means comprises a pusher plate reciprocally mounted in said chamber and spring means arranged between an end wall of said container located at the first end thereof and said plate for urging said bread slices towards the second end of said container.

3. The invention of claim 1 wherein said reset means comprises at least one tension spring.

4. The invention of claim 3 wherein said spring is located exteriorly on said container.

5. The invention of claim 3 wherein said spring is located interiorly of said container.

6. The invention of claim 1 wherein said plunger comprises a vertically disposed plate portion reciprocally mounted in said one of said openings and having a horizontally disposed flange portion secured to said plate portion and positioned in said chamber to extend towards the other end of said container and overlie and engage a bread slice upon actuation of said plunger.

7. The invention of claim 6 wherein said plunger further comprises vertically disposed prong portions positioned on opposite ends of said flange portion to cooperate with said flange portion to substantially encompass a bread slice when it is dispensed out of said container.

8. The invention of claim 6 wherein a portion of said plate portion projects vertically below said flange portion to positively separate a dispensed bread slice from a next adjacent bread slice.

9. The invention of claim 6 wherein said plunger further comprises a second horizontally disposed flange portion spaced vertically below said first-mentioned flange portion at a distance substantially equal to the vertical height of a bread slice.

10. The invention of claim 1 wherein means closing said other opening means further comprises a trap door pivotally mounted exteriorly on said bottom wall adjacent to said slot and means for normally urging said trap door to a closed position covering said slot, said plunger positioned vertically above said trap door to open said trap door upon actuation of said plunger.

11. The invention of claim 1 wherein said adjusting means further comprises a knob rotatably mounted for adjusted axial movement at the second end of said container and operatively connected to said plate, said plate disposed in said chamber to be moved by said knob relative to said plunger to vary the distance therebetween.